US012710436B2

(12) United States Patent
Friesen et al.

(10) Patent No.: US 12,710,436 B2
(45) Date of Patent: Aug. 18, 2026

(54) METHOD OF TRANSFERRING LIQUID FROM REAGENT RESERVOIR USING A ROBOTIC HANDLER

(71) Applicant: Beckman Coulter, Inc., Brea, CA (US)

(72) Inventors: Taylor A. Friesen, Indianapolis, IN (US); Kristina K. Lu, Carmel, IN (US); Mark F. Sauerburger, Zionsville, IN (US); Zachary M. Smith, Avon, IN (US); Jeffrey J. Wilson, Zionsville, IN (US)

(73) Assignee: Beckman Coulter, Inc., Brea, CA (US)

( * ) Notice: Subject to any disclaimer, the term of this patent is extended or adjusted under 35 U.S.C. 154(b) by 871 days.

(21) Appl. No.: 17/788,336

(22) PCT Filed: Dec. 18, 2020

(86) PCT No.: PCT/US2020/065825
§ 371 (c)(1),
(2) Date: Jun. 23, 2022

(87) PCT Pub. No.: WO2021/133649
PCT Pub. Date: Jul. 1, 2021

(65) Prior Publication Data

US 2023/0022389 A1 Jan. 26, 2023

Related U.S. Application Data

(60) Provisional application No. 62/952,968, filed on Dec. 23, 2019.

(51) Int. Cl.
*G01N 35/00* (2006.01)
*B01L 3/00* (2006.01)
*G01N 35/10* (2006.01)

(52) U.S. Cl.
CPC .......... *G01N 35/0099* (2013.01); *B01L 3/527* (2013.01); *G01N 35/1002* (2013.01); *B01L 2300/0851* (2013.01)

(58) Field of Classification Search
CPC ........ B01L 3/5085; B01L 3/527; B01L 3/563; B01L 3/56; B01L 3/502761; B01L 3/50855; B01L 2300/0851; B01L 3/52; G01N 35/00; G01N 35/0099; G01N 35/1002; G01N 35/1011; G01N 35/1016; G01N 35/1065
See application file for complete search history.

(56) References Cited

U.S. PATENT DOCUMENTS 4,952,518 A 8/1990 Johnson et al.
6,015,534 A 1/2000 Atwood
6,143,250 A * 11/2000 Tajima .................. B01L 3/5085 422/570
6,187,266 B1 * 2/2001 Lin ......................... A61L 2/186 422/31
6,197,572 B1 3/2001 Schneebeli
6,730,883 B2 5/2004 Brown et al.
6,766,279 B2 7/2004 Linley et al.
6,878,905 B2 4/2005 Brown et al.
7,081,600 B2 7/2006 Brown et al.
7,328,135 B2 2/2008 Linley et al.
7,711,523 B2 5/2010 Linley et al.
8,247,217 B2 8/2012 Ceremony et al.
8,319,823 B2 11/2012 Chen et al.
8,572,507 B2 10/2013 Abrams et al.
8,784,753 B2 7/2014 Ceremony et al.
8,823,770 B2 9/2014 Brunner et al.
9,456,137 B2 9/2016 Brunner et al.
9,492,825 B2 11/2016 Howell et al.
9,505,002 B2 11/2016 Momboisse et al.
9,507,809 B2 11/2016 Burdette et al.
9,659,153 B2 5/2017 De La Torre-bueno
2009/0004754 A1 * 1/2009 Oldenburg .......... B01L 3/50853 422/400
2009/0008405 A1 * 1/2009 Mathus ................... B01L 3/508 206/499
2011/0030809 A1 * 2/2011 Ying .................. G01N 35/1095 137/13
2012/0065912 A1 * 3/2012 Corkan .............. G01N 35/1011 73/1.79
2012/0085784 A1 * 4/2012 Bakris ................... A61M 35/00 222/23
2013/0037059 A1 2/2013 Stafford
(Continued)

FOREIGN PATENT DOCUMENTS

AU 2020412678 9/2023
CN 202290081 U * 7/2012
(Continued)

OTHER PUBLICATIONS

"International Application Serial No. PCT US2020 065825, International Search Report mailed Apr. 19, 2021", 5 pgs.
"International Application Serial No. PCT US2020 065825, Written Opinion mailed Apr. 19, 2021", 7 pgs.
"International Application Serial No. PCT US2020 065825, International Preliminary Report on Patentability mailed Jul. 7, 2022", 8 pgs.
"Indian Application Serial No. 202247035676, First Examination Report mailed Aug. 8, 2022", 5 pgs.
"Israel Application Serial No. 294117, Office Action mailed Jan. 23, 2023", with machine translation, 5pgs.
"Indian Application Serial No. 202247035676, Response filed Feb. 7, 2023 to First Examination Report mailed Aug. 8, 2022", 16 pgs.
(Continued)

*Primary Examiner* — Robert J Eom
*Assistant Examiner* — Alison Claire Gerhard
(74) *Attorney, Agent, or Firm* — Merchant & Gould P.C.

(57) ABSTRACT

Described herein are method of transferring liquid using a robotic liquid handler from a reagent reservoir having a sloped bottom along a length of the reagent reservoir, the sloped bottom defining a shallow end and a deep end of the reagent reservoir, wherein the shallow end is proximal to a first side-wall of the reagent reservoir, wherein the deep end is proximal to a second side-wall of the reagent reservoir opposite the first side-wall.

16 Claims, 8 Drawing Sheets

(56) References Cited

U.S. PATENT DOCUMENTS

| | | | | |
|---|---|---|---|---|
| 2015/0100155 | A1 | 4/2015 | Hren et al. | |
| 2015/0202877 | A1* | 7/2015 | Hatfield | B41J 2/17596 347/85 |
| 2016/0086106 | A1 | 3/2016 | Desimas et al. | |
| 2017/0136456 | A1* | 5/2017 | Chen | B01F 31/85 |

FOREIGN PATENT DOCUMENTS

| | | | | | |
|---|---|---|---|---|---|
| CN | 104040352 | A | | 9/2014 | |
| CN | 104769439 | A | | 7/2015 | |
| CN | 105074473 | A | * | 11/2015 | B01L 3/523 |
| CN | 206266574 | U | | 6/2017 | |
| CN | 208086343 | U | | 11/2018 | |
| CN | 209576723 | U | * | 11/2019 | |
| CN | 115104033 | | | 9/2022 | |
| EP | 2693218 | | | 8/2016 | |
| EP | 4081807 | | | 4/2025 | |
| IL | 294117 | B | | 8/2025 | |
| JP | S5821860 | | | 2/1983 | |
| JP | S61502078 | | | 9/1986 | |
| JP | H1010105 | | | 1/1998 | |
| JP | 2004226274 | | | 8/2004 | |
| JP | 2012525567 | | | 10/2012 | |
| JP | 2013150623 | A | | 8/2013 | |
| JP | 2013535193 | | | 9/2013 | |
| JP | 2014532882 | | | 12/2014 | |
| JP | 2023509392 | | | 3/2023 | |
| JP | 7383158 | | | 11/2023 | |
| KR | 20220116273 | | | 8/2022 | |
| KR | 1020227024877 | | | 3/2025 | |
| WO | WO-2012012779 | A2 | * | 1/2012 | B01L 3/021 |
| WO | 2016090113 | | | 6/2016 | |
| WO | 2018057959 | | | 3/2018 | |
| WO | 2021127014 | | | 6/2021 | |

OTHER PUBLICATIONS

"Australian Application Serial No. 2020412678, First Examination Report mailed May 2, 2023", 3 pgs.

"European Application Serial No. 20842778.1, Response filed Jan. 17, 2023 to Communication pursuant to Rules 161(1) and 162 EP", 22 pgs.

"Canadian Application Serial No. 3,165,401, Examiners Rule 86(2) Report mailed Jul. 25, 2023", 4 pgs.

"Japanese Application Serial No. 2022-538378, Notification of Reasons for Refusal mailed Jul. 14, 2023", w English Translation, 6 pgs.

"Australian Application Serial No. 2020412678, Response filed Aug. 16, 2023 to First Examination Report mailed May 2, 2023", 11 pgs.

"Japanese Application Serial No. 2022-538378, Response filed Sep. 6, 2023 to Notification of Reasons for Refusal mailed Jul. 14, 2023", w english claims, 11 pgs.

"Canadian Application Serial No. 3,165,401, Response filed Nov. 15, 2023 to Examiners Rule 86(2) Report mailed Jul. 25, 2023", 12 pgs.

"Israel Application Serial No. 294117, Notification of Defects in Patent Application mailed Feb. 21, 2024", 6 pgs.

"Canadian Application Serial No. 3,165,401, Examiners Rule 86(2) Report mailed Apr. 29, 2024", 4 pgs.

"European Application Serial No. 20842778.1, Communication Pursuant to Article 94(3) EPC mailed May 17, 2024", 4 pgs.

"Canadian Application Serial No. 3,165,401, Response filed Jun. 10, 2024 to Examiners Rule 86(2) Report mailed Apr. 29, 2024", w claims, 8 pgs.

"European Application Serial No. 20842778.1, Response filed Jun. 19, 2024 to Communication Pursuant to Article 94(3) EPC mailed May 17, 2024", 12 pgs.

"Israel Application Serial No. 294117, Response filed Jun. 27, 2024 to Notification of Defects in Patent Application mailed Feb. 21, 2024", w english claims, 11 pgs.

"Israel Application Serial No. 294117, Response filed Jun. 13, 2024 to Notification of Defects in Patent Application mailed Feb. 21, 2024", with English translation, 59 pgs.

China National Intellectual Property Administration; Notification of the First Office Action (translated) mailed Dec. 3, 2024; 13 pages.

China National Intellectual Property Administration; Response to the Second Office Action (partially translated) for Application No. 202080096378.X, filed on Aug. 13, 2025, 5 pages.

China National Intellectual Property Administration; Notification of Intention to Grant Patent for invention (translated) and Granted Claims in English for Application No. 202080096378.X mailed on Oct. 13, 2025; 8 pages.

Israel Patent Office, Official Notification Prior to Acceptance and Copy of Specification and Claims for Patent Application 294117 dated Jan. 29, 2025, 30 pages.

European Patent Office, Communication under Rule 71(3) EPC Intention to Grant for Application No. 20842778.1 mailed Feb. 12, 2025, 44 pages.

Hong Kong Intellectual Property Department, Official Filing Receipt and Application Documents for Application No. 62023069410.6, filed Jun. 3, 2025, 8 pages.

China National Intellectual Property Administration; Notification of the Second Office Action (translated) for Application No. 202080096378.X mailed Jul. 10, 2025; 5 pages.

Canada Intellectual Property Office; Third Office Action for Application No. 3,165,401 mailed Jan. 27, 2025, 4 pages.

Canada Intellectual Property Office Response to Third Canadian Office Action for Application No. 3,165,401 filed on Mar. 10, 2025.

Korean Intellectual Property Office; Notice of Preliminary Rejection for Application No. 10-2022-7024877 mailed Sep. 3, 2025 (translated); 11 pages.

Korean Intellectual Property Office; Response filed for Application No. 10-2022-7024877 on Oct. 31, 2024, 9 pages.

Intellectual Property Office of Singapore (IPOS); Invitation To Amend (ITA) for Application No. 11202250654X mailed on Dec. 30, 2024, 4 pages.

Intellectual Property Office of Singapore (IPOS); Response filed to Invitation To Amend (ITA) for Application No. 11202250654X mailed on Feb. 6, 2025 13 pages.

Korean intellectual Property Office; Written decision on registration for Application No. 10-2022-7024877 mailed on Mar. 11, 2025, 3 pages.

* cited by examiner

METHOD OF TRANSFERRING LIQUID FROM REAGENT RESERVOIR USING A ROBOTIC HANDLER

CLAIM OF PRIORITY

This patent application is a national stage application of PCT/US2020/065825, filed Dec. 18, 2020, which claims the benefit of priority to U.S. Provisional Application Ser. No. 62/952,968, filed Dec. 23, 2019, which is incorporated by reference herein in its entirety.

BACKGROUND

Existing bulk reagent reservoirs for use in robotic liquid handlers that are used to process and analyze biological samples, such as in the preparation of libraries of nucleic acid fragments (e.g., libraries of fragments derived from cellular DNA or RNA molecules) including next-generation sequencing (NGS) libraries, suffer from various drawbacks. One drawback emerges when the amount of a reagent in a kit does not provide enough overage of each reagent to use on automation. The dead volume (e.g., the amount in the reservoir enough to be uniform across the bottom of the well and be pipetted) is far too high in standard reagent reservoirs, which results in a decrease in the number of actual samples the kit can process. Stated differently, entropy and surface tension can create an unequal distribution of liquid across the bottom of traditional/existing bulk reservoirs as the volume decreases. This unequal distribution can cause local depletions of liquid as it is aspirated, resulting in unequal aspiration or completely missed aspiration by probes of a multi-channel pipettor.

SUMMARY

The bulk reagent reservoirs described herein address the drawbacks of existing reagent reservoirs. Briefly, the bulk reagent reservoirs described herein contain a slope from front to back on the bottom of the reservoir. This allows for at least eight pipettor tips (e.g., a 16 tip pipettor head at 0.45 mm spacing/tip that could still access the reservoir) with all tips above the slope from a multi-channel pipettor to simultaneously access a volume greater than, e.g., about 20 mL, or as little as about 500 μL. The slope will also contain a taper towards the single tip access point to gather the volume into a concise location for the single tip. After this volume is removed, a single tip from a single-channel pipettor or a single channel of a multi-channel pipettor will be able to access the remaining volume in order to reduce dead volume. The bulk reservoir design will allow increased sample quantity by minimizing dead volume. The sloped area will contain less than 0.5 mL of volume and can be left in the reservoir for non-volume critical reagents or user-supplied bulks such as water and ethanol.

The disclosure therefore relates to a method of transferring liquid using a robotic liquid handler, the method comprising: aspirating a first volume of liquid out of a reagent reservoir using a multi-channel pipettor of the robotic liquid handler, the reagent reservoir having a sloped bottom along a length of the reagent reservoir, the sloped bottom defining a shallow end and a deep end of the reagent reservoir, wherein the shallow end is proximal to a first side-wall of the reagent reservoir, wherein the deep end is proximal to a second side-wall of the reagent reservoir opposite the first side-wall; and aspirating a second volume of liquid out of the deep end of the reagent reservoir using a single-channel pipettor or a single channel of a multi-channel pipettor of the robotic liquid handler, wherein aspiration of the second volume out of the deep end results in depletion of liquid in the shallow end of the reagent reservoir Further, the disclosure relates to a method of transferring liquid using a robotic liquid handler, the method comprising:

filling a reagent reservoir with a liquid such that a sloped bottom of the reagent reservoir, wherein the sloped bottom forms a deep end and a shallow end;

removing a first portion of the liquid from the reagent reservoir using a multi-channel pipettor having a first pipettor tip extending into a first position near the shallow end and a second pipettor tip extending into a second position near the deep end; and removing a second portion of the liquid from the reagent reservoir using a multi-channel pipettor having a single pipettor tip extending into a second position near the deep end or a pipettor tip of a single-channel pipettor extending into the deep end.

The disclosure also relates to a method of transferring liquid using a robotic liquid handler, the method comprising:

aspirating a first volume of liquid out of a reagent reservoir using a first pipettor of the robotic liquid handler, the first pipettor having a number of tips including a first tip and a second tip, the reagent reservoir having a sloped bottom along a length of the reservoir, the sloped bottom defining a shallow end and a deep end of the reagent reservoir, wherein the first tip is positioned over the shallow end of the reagent reservoir and another tip is positioned over the deep end of the reagent reservoir during the aspiration of the first volume of liquid; and aspirating a second volume of liquid out of the reagent reservoir using a second pipettor of the robotic liquid handler, the second pipettor having a number of tips less than the number of tips of the first pipettor, wherein a tip of the second pipettor is positioned over the deep end of the reagent reservoir during the aspiration of the second volume.

And the disclosure relates to a method of transferring liquid from a bulk storage vessel using a robotic liquid handler, the method comprising:

adding liquid to the bulk storage reservoir such that: a first volume of the bulk storage reservoir formed by a sloped bottom of the storage reservoir forming a deep end and a shallow end fills;

and a second volume of the bulk storage vessel above the first volume formed by first and second end-walls of the bulk storage vessel at the deep and shallow above becomes at least partially filled; emptying the second volume using a multi-channel pipettor; and emptying the first volume using a single-channel pipettor or a single channel of a multi-channel pipettor.

Embodiment 17 relates to the method of Embodiment 16, wherein:

the multi-channel pipettor extends between the first end-wall and the second end-wall above the first volume; and the single-channel pipettor or a single channel of a multi-channel pipettor extends across the deep end.

DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Figures 1, 2, 3:
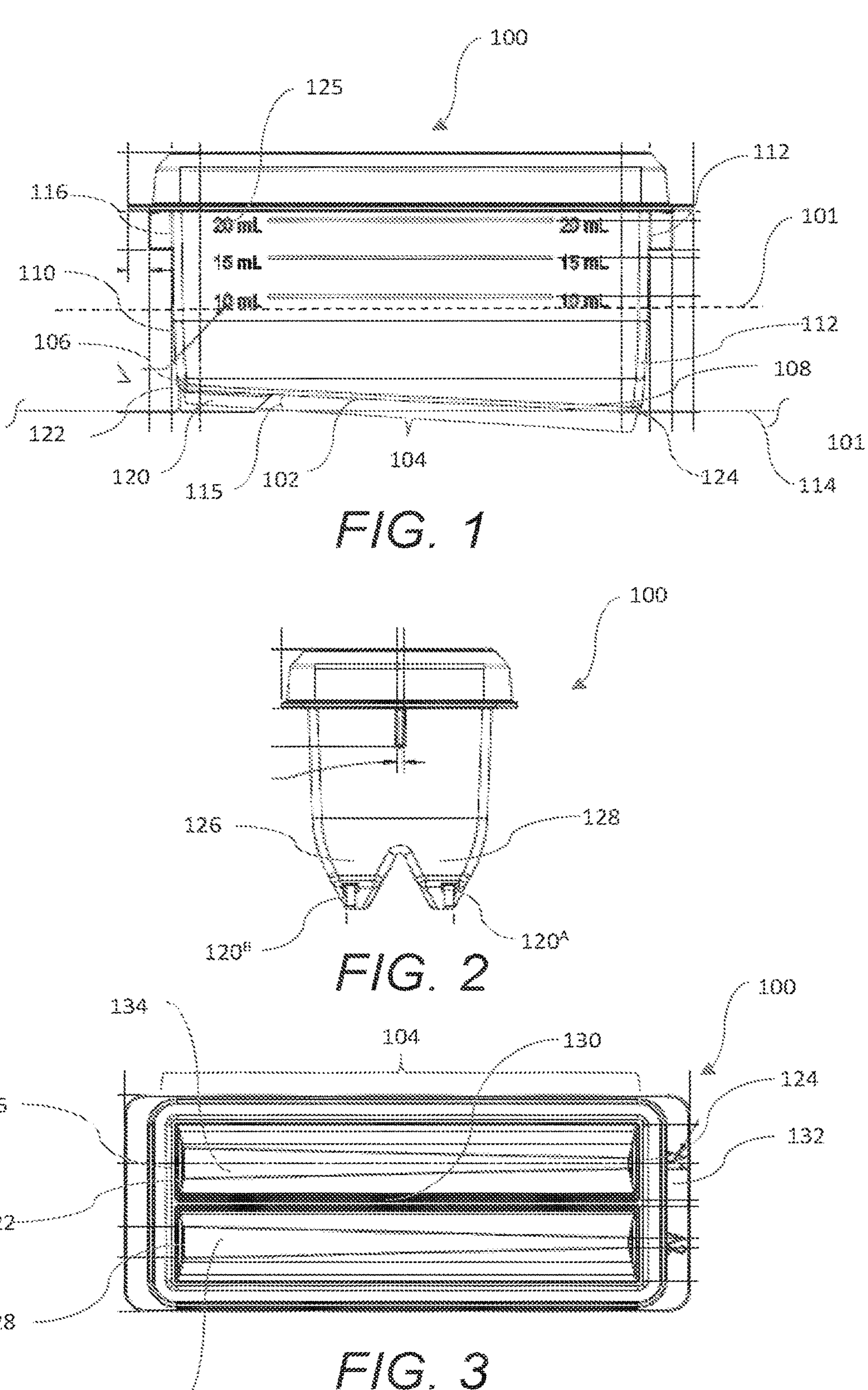
FIG. 1 is a side view of an example of a reagent reservoir.
FIG. 2 is a front view of an example of a reagent reservoir.
FIG. 3 is a top view of an example of a reagent reservoir.

Making reference to FIG. 1, reagent reservoir 100 has longitudinal axis 101 and a sloped bottom 102 along a width 104 of the reagent reservoir 100. The sloped bottom 102 defines a shallow end 106 and a deep end 108 of the reagent reservoir 100, where the shallow end 106 is proximal to a first side-wall 110 of the reagent reservoir 100 and the deep end 108 is proximal to a second side-wall 112 of the reagent reservoir 100 opposite the first side-wall 110. The reagent reservoir 100 shown in FIG. 1 can have a lid (not shown) that can span from an outer edge 116 of the first side-wall 110 to an outer edge 118 of the second side-wall 112. The lid functions to prevent contamination and to at least reduce evaporation of reagents located inside reagent reservoir 100.

The reagent reservoir 100 also has protuberance 120, which functions to elevate first end 122 relative to second end 124. Protuberance 120 functions to keep the top of the reservoir level/horizontal when resting on a countertop or flat surface 114. Protuberance 120 can take any suitable form, such as fin, tab or a notch, so long as it elevates first end 122 relative to second end 124. Protuberance 120 creates an angle (θ) 115 between flat surface 114 and first end 122. The angle θ can be any suitable angle, sch as an angle from about 3° to about 5°.

Reagent reservoir 100 optionally comprises volume markings 125 as shown in FIG. 1

FIG. 2 shows an end-view of reagent reservoir 100 from first end 122. The end-view shown in FIG. 2 shows an example of a reagent reservoir 100 having a plurality of protuberances (in this case two tabs or fins) 120$^{A}$ and 120$^{B}$, which elevate first end 122 relative to second end 124. Further, the end view of this reagent reservoir shows that the reservoir can have a first channel 126 and a second channel 128 spanning width 104 of reagent reservoir 100 and divided by a dividing wall (numeral 130 in FIG. 3), also spanning width 104, and which serves to separate first channel 126 from second channel 128. In short, the reagent reservoir can have multiple chambers, each with sloped bottom.

A top view of reagent reservoir 100, without a lid, is shown in FIG. 3. FIG. 3 shows reagent reservoir 100, first channel 126 and second channel 128, spanning width 104. The channels are separated by dividing wall 130, which also spans width 104. Also shown in FIG. 3 is lip 132, which goes around a top portion of reagent reservoir 100 and on which a lid, when present, can sit. First channel 126 and second channel 128 can slope at a constant slope from first end 122 to second end 124. FIG. 1 is an example of a reagent reservoir 100 having channels 126 and 128 (not shown in FIG. 1) having a constant slope from first end 122 to second end 128. Or the slope of first channel 126 and second channel 128 can vary from first end 122 to second end 124. The specific slope can be chosen based on what may e required for aqueous liquids to effectively pool in the shallow end (e.g., second end 124), while not being so steep that suspended particles (e.g. the magnetic beads described herein) would concentrate at that same end (e.g., second end). This slope can also affect the volume accessible to all tips versus a single tip of a pipettor.

Further, first channel 126 can have a floor 134 having any suitable shape. Likewise, second channel 128 can have a floor 136 having any suitable shape, with floor 136 having the same shape or a different shape relative to floor 134. In the example presented in FIG. 3, floors 134 and 136 have substantially the same triangular shape from first end 122 to second end 124.

Figure 4:
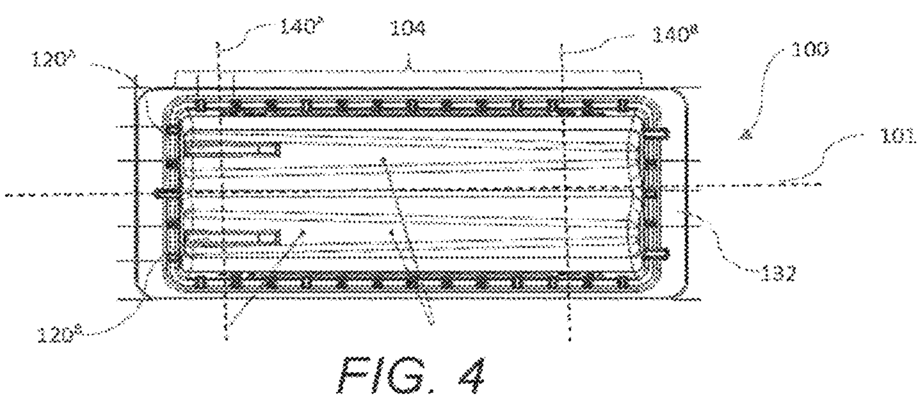
FIG. 4 is a bottom view view of a reagent reservoir.

FIG. 4 is a bottom view of reagent reservoir 100. FIG. 4 shows reagent reservoir 100, first channel 126 and second channel 128, spanning width 104. The channels are separated by dividing wall 130, which also spans width 104. Also shown in FIG. 4 is lip 132, which goes around a top portion of reagent reservoir 100 and on which a lid sits. FIG. 4 also shows first and second protuberances (e.g., tabs or fins) 120 A and 120 B, which elevate first end 122 relative to second end 124.

Figure 5A:
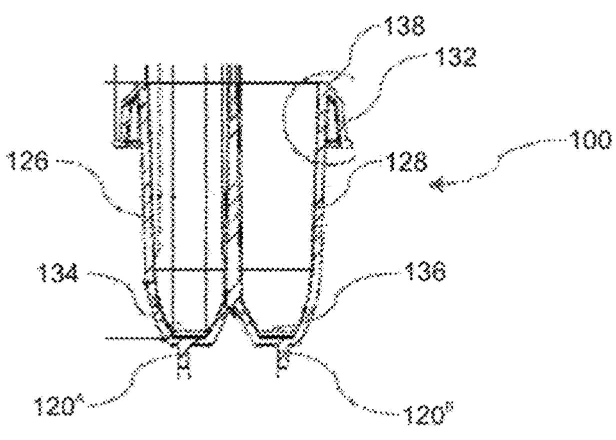
FIG. 5A is a cross-section of an example of a reagent reservoir on the "shallow" end of the reservoir.

FIG. 5A is a cross section of FIG. 1 along an axis 140A perpendicular to longitudinal axis 101 in FIG. 4, at the shallow end 106, looking down the longitudinal axis toward the shallow end 106 (not shown). FIG. 5A shows first and second protuberances (e.g., tabs or fins) 120$^{A}$ and 120$^{B}$, which elevate first end 122 relative to second end 124 (not shown in FIG. 5A). The reagent reservoir 100 in FIG. 5A also has lip 132 which goes around a top portion 138 of reagent reservoir 100. First channel 126 has a floor 134 and second channel 128 has a floor 136 having any suitable shape, such as a shape with decreasing cross-section along a width of the reagent reservoir from a first side-wall to a second side-wall, such as a V-shape, with floor 136 having the same shape or a different shape relative to floor 134. In the example presented in FIG. 5A, floors 134 and 136 have substantially the same flat shape along width 104. But floors 134 and 136 could also be, independently rounded from first end 122 to second end 124.

Figure 5B:
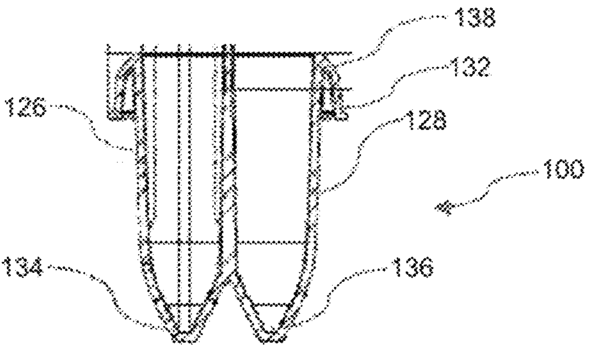
FIG. 5B is a cross-section of an example of a reagent reservoir on the "deep" end of the reservoir.

Finally, FIG. 5B is a cross section of FIG. 1 along an axis 140B perpendicular to longitudinal axis 101 in FIG. 4, at the shallow end 106, looking down the longitudinal axis toward the deep end 108 (not shown). The reagent reservoir 100 in FIG. 5B also has lip 132 which goes around a top portion 138 of reagent reservoir 100. First channel 126 has a floor 134 and second channel 128 has a floor 136 having any suitable shape, such as a V-shape, with floor 136 having the same shape or a different shape relative to floor 134. In the example presented in FIG. 5B, floors 134 and 136 have substantially the same flat shape along width 104. Floors 134 and 136 could also be, independently rounded from first end 122 to second end 124.

Reagent reservoirs contemplated herein, such as reagent reservoir 100, can be made of any suitable material including, but not limited to, polymers such as polycarbonate, polyethylene, polypropylene, polyethylene terephthalate (PET), and the like. It should be understood that one portion of the reagent reservoirs contemplated herein can be made of a first material, while other portions can be made of a second material, so long as the first material is compatible with the second material.

Figure 9:
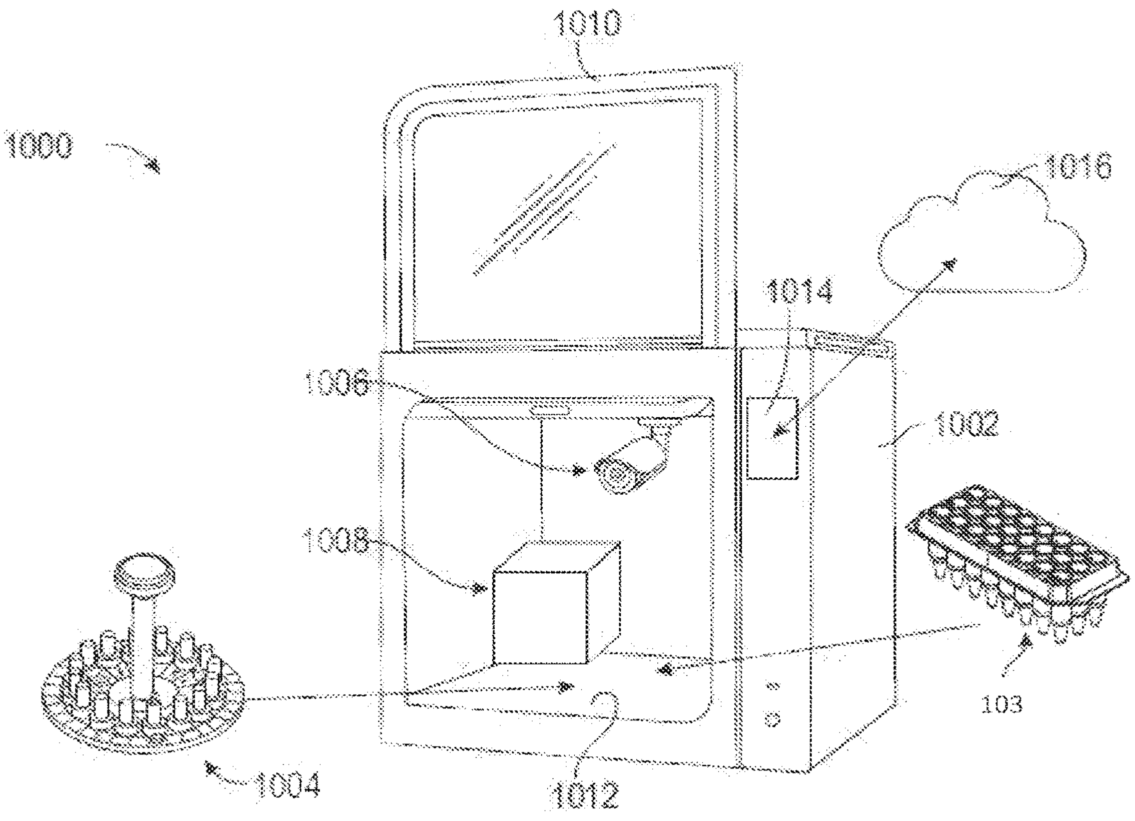
FIG. 9 is perspective view of a robotic liquid handler of FIG. 9 comprising a housing, a carousel, a reaction vessel, a thermal cycler module and an imaging device.
Figure 10:
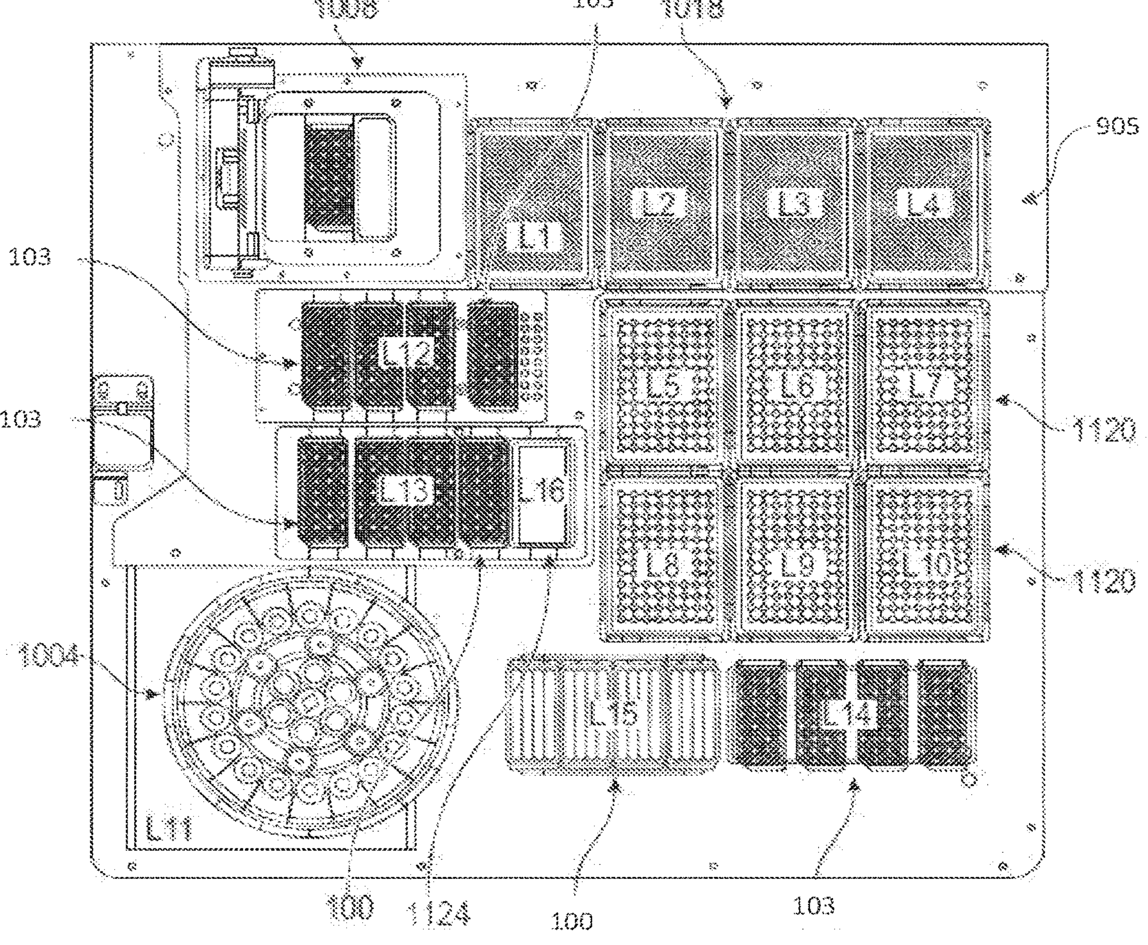
FIG. 10 is plan view of an example of a deck for loading into the housing of FIG. 8 with spaces for various components including a reagent reservoir.
Figure 11:
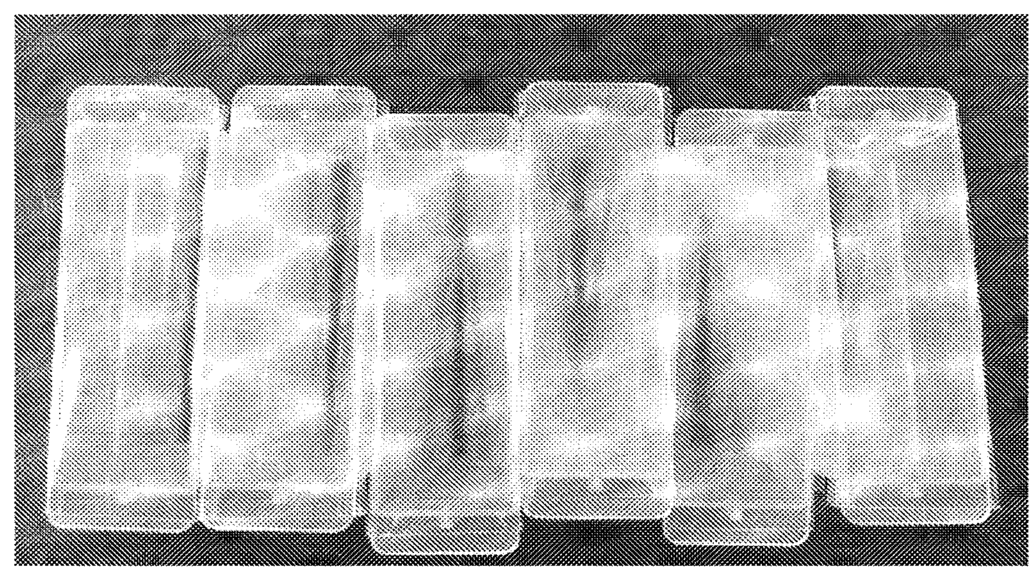
FIG. 11 is a top view photograph of reagent reservoirs.

The reagent reservoirs contemplated herein can be used in the context of robotic liquid handler 200 (see FIGS. 9-11). For explanatory purposes, robotic liquid handler 200 will mainly be described herein as a system for processing and analyzing biological samples, such as the preparation of libraries of nucleic acid fragments (e.g., libraries of fragments derived from DNA or RNA molecules) including but not limited to next-generation sequencing (NGS) libraries.

Figure 7:
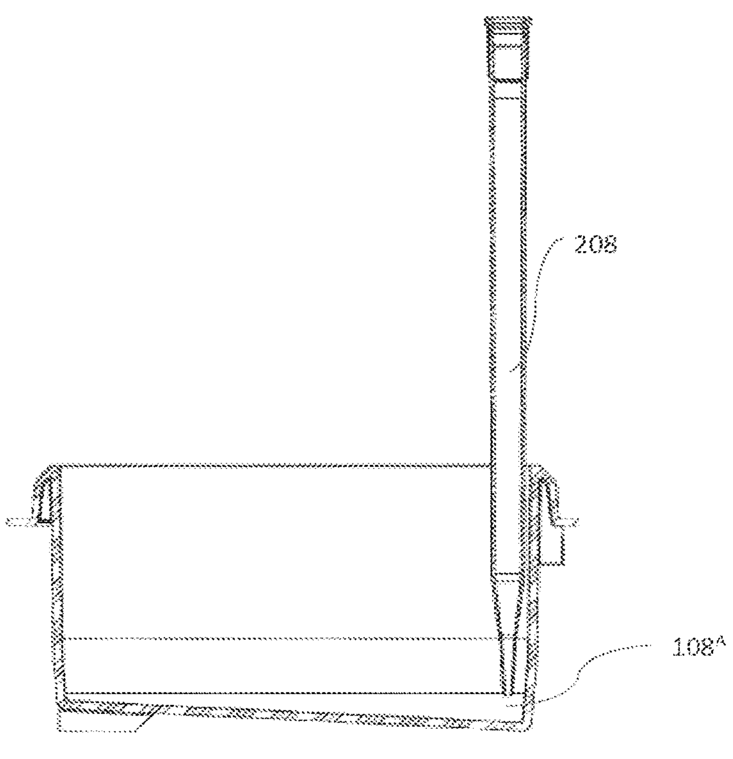
FIG. 7 is a cross-section of an example of a reagent reservoir.

The reagent reservoirs described herein can be used in a method of transferring liquid using a robotic liquid handler, the method comprising: aspirating a first volume of liquid out of a reagent reservoir 100 using a multi-channel pipettor 204 (e.g., any pipettor with the ability to aspirate/dispense liquid into more than one channel simultaneously, which encompasses Span-8 style multichannel pipettors with independent motion and aspirate/dispense functions between the different channels and other multichannel pipettors that do not have independent motion and aspirate/dispense functions. It should be immaterial if the multi-channel pipettor has independent probes versus fixed probes, so long as a fixed system allows for loading a single tip for accessing the sloped section and act as a single-channel pipettor or the independent system allows for enough vertical difference between probes to accommodate the slope.) of the robotic liquid handler, the reagent reservoir 100 having a sloped bottom 102 along a width 104 of the reagent reservoir 100, the sloped bottom 102 defining a shallow end 106 and a deep end 108 of the reagent reservoir 100, wherein the shallow end 106 is proximal to a first side-wall 110 of the reagent reservoir 100, wherein the deep end 108 is proximal to a second side-wall 112 of the reagent reservoir 100 opposite the first side-wall 110; and aspirating a second volume of liquid out of the deep end 108 of the reagent reservoir 100 using a single-channel pipettor 208 (see FIG. 7; or a single channel of a multi-channel pipettor) of the robotic liquid handler, wherein aspiration of the second volume out of the deep end 108 results in depletion of liquid in the shallow end 106 of the reagent reservoir 100.

Figure 6:
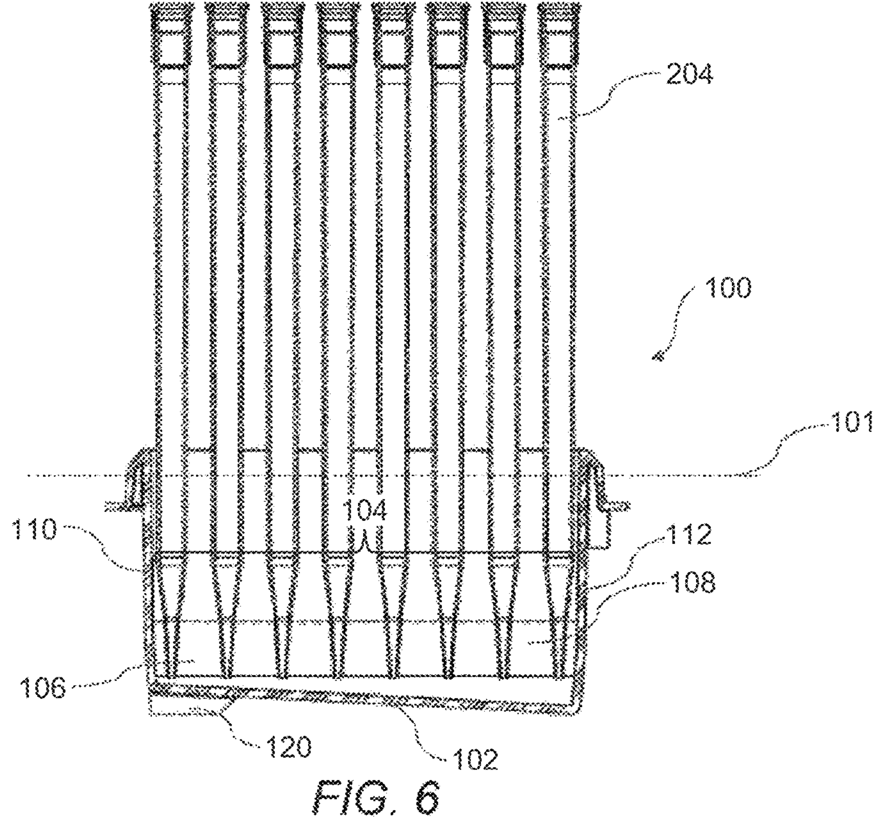
FIG. 6 is a cross-section of an example of a reagent reservoir.

The multi-channel pipettor can be any suitable pipettor, including a four-channel pipettor such as those available from manufactures such as Genex Laboratory Products, Eppendorf, Raning, and Gilson. Further, the multi-channel pipettor can be positioned in any suitable position of the deep end 108 of the reagent reservoir 100. For example, making reference to FIG. 6, the multi-channel pipettor can be positioned such that a plurality of pipettor tips [210] of the multi-channel pipettor are arranged longitudinally, along longitudinal axis 101, as shown. Accordingly, aspirating the first volume of liquid out of the reagent reservoir using the multi-channel pipettor 204 of the robotic liquid handler 200 can include aspirating the first volume using the multi-channel pipettor along the width (e.g., along longitudinal axis 101) of the reagent reservoir 100 from the first side-wall 110 to the second side-wall 112.

The single-channel pipettor (or a single channel of a multi-channel pipettor) can be any suitable pipettor and can be positioned in any suitable position of the shallow end 106. Making reference to FIG. 7, the single-channel pipettor or a single channel of a multi-channel pipettor can be positioned at a deepest portion 108A of reagent reservoir 100, wherein the deepest portion 108A is proximal to the second side-wall 112 of the reagent reservoir 100.

The methods described herein can further comprise depositing particles (e.g., beads, such as magnetic beads) in the reagent reservoir 100 first, followed by depositing reagents/liquid therein or by depositing beads reagents/liquid (already in the reagent reservoir); and allowing the beads to become suspended in the liquid; wherein the beads settle (e.g., evenly) along the sloped bottom, where the slope can be from about 3° to about 5°, as described in FIG. 1 in terms of the angle θ. The beads can be, for example, magnetic particles. Suitable magnetic particles for use in the methods described herein include, but are not limited to AMPure XP beads available from Beckman Coulter, Inc., Brea, CA. Suitable magnetic particles also include those described in U.S. Pat. Nos. 5,705,628; 5,898,071; and 6,534,262, and in PCT/US2019/042628, filed Jul. 19, 2019, all of which are incorporated by reference as if fully set forth herein.

When beads are deposited in reagent reservoir 100, maintaining a uniform suspension in the reservoir for liquids or reagents that contain particles is desired. Over time, the particles will settle to the bottom of the reservoir. The slope of the reservoir is such that the particles will settle uniformly across the length of the reservoir without accumulating in the shallow end (or the deep end, for that matter). In this way, a multichannel pipettor can be used to efficiently resuspend the particles to re-create a uniform suspension just prior to use.

The magnetic particles of the disclosure can comprise a magnetic or a paramagnetic core, surrounded by a coating. In an example, the magnetic or a paramagnetic particles are coated with one or more layers of a non-magnetic material. The use of coated magnetic particles, having no exposed iron, on their surfaces, can eliminate the possibility of iron interfering with certain downstream manipulations of a sample. The coating can be, for example, a polymer layer, or a silica layer.

Example polymer layers can include polyethylene, polystyrene, poly methyl methacrylate, polyvinyl alcohol, or any other suitable polymer. Example silica layers can include silicon dioxide, borosilicate, soda lime, barium titanate, and other types of glass. The polymer or silica layer can be for adjusting the density of the magnetic particles. For example, the polymer or silica layer can adjust the density of the magnetic particles to be close to the density of the sample, for example, an aqueous sample (e.g., approximately 1 $g/cm^3$).

The coating can also comprise a ligand such as capture reagent or a functional group, including those mentioned herein, for selectively or non-selectively binding target analytes. The functional group can be for adsorbing biomolecules, such as nucleic acids, which can non-sequence-specifically and reversibly bind to the functional group coating the magnetic particles. The polynucleotides can be DNA, RNA, or polyamide nucleic acids (PNAs). In an example, the functional group is a carboxyl group. Various coatings comprising functional groups suitable for these purposes are described in U.S. Pat. Nos. 5,705,628, 5,898,071, and 6,534,262, the teachings of which are hereby incorporated by reference into this application in their entirety. Any of the coatings described herein can be functionalized with surface chemicals as described herein, for example, with carbolic acid, streptavidin, amine, hydrazide, silanol, azide. And those can be further functionalized with biological molecules such as antibodies, enzymes, DNA or RNA fragments, catalysts, etc.

In some examples, the coating can comprise a capture reagent. The capture reagent can be for capturing an analyte in a sample. The surface of the magnetic particles can be coated with a capture reagent that is a suitable ligand or receptor (e.g., antibodies, lectins, oligonucleotides, other affinity groups, or any of the other capture reagents mentioned herein), which can selectively bind a target analyte or a group of analytes in a mixture. In some examples, the capture reagent can be an antibody.

Those of skill will recognize that any number of capture reagents can be used for this purpose, e.g. aptamers, nanoparticles, binding proteins, and the like. The capture reagent can be designed to capture a specific analyte or a specific panel of analytes, e.g., drug panel or endocrine panel, etc.

Alternatively, the ligand can include an enzyme. In some embodiments the enzyme can be linked to the coating in order to selectively interact with a substrate of that enzyme. Upon interacting with the substrate, the enzyme can function to modify, degrade or digest the substrate. This can lead to generation of a substance of interest through enzyme's action or to remove a substrate from a sample. According to various embodiments, the enzyme can be trypsin.

As discussed herein, the reagent reservoir 100 can be used in the context of a robotic liquid handler. The reagent reservoir 100 can have protuberances, such as tabs or fins 120A and 120B that can be aligned with slots on the liquid handler to position the reagent reservoir on a deck of the robotic liquid handler, as described in greater detail herein. Tabs or fins 120A and 120B can be engaged with a deck of the robotic liquid handler 200 to elevate the shallow end 106 above the deep end 108 and the first side-wall 110 and the second side-wall 112 stand vertical on the deck.

Figure 8:
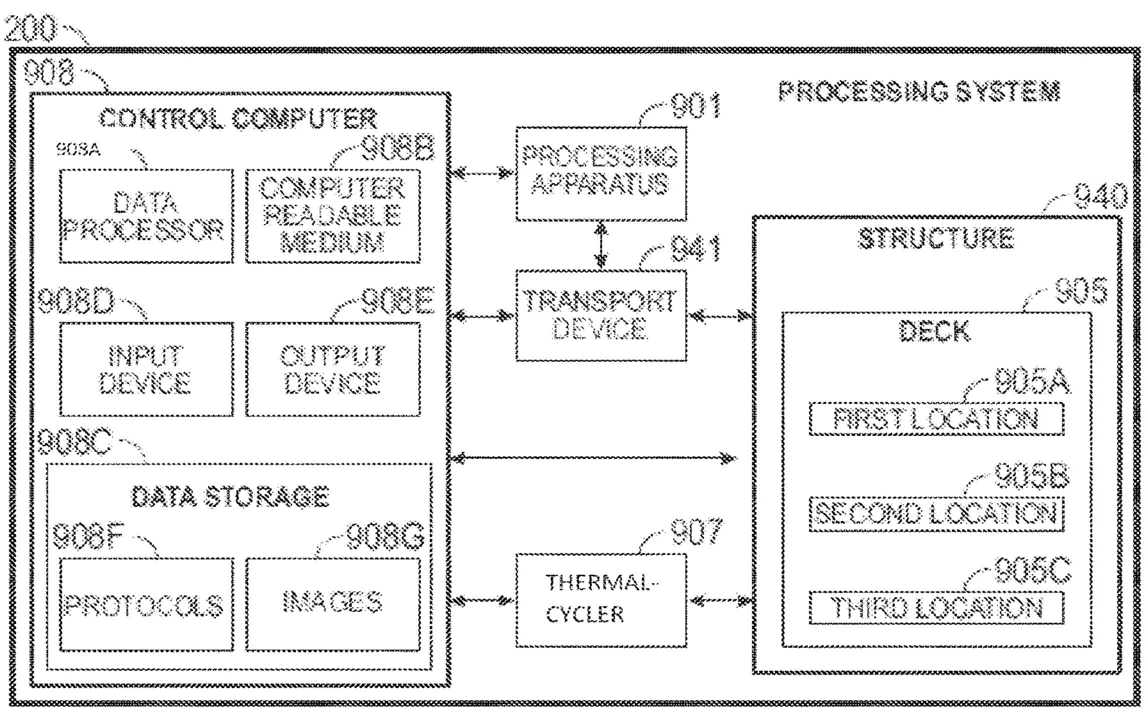
FIG. 8 is a block diagram of an example of a robotic liquid handler.

FIG. 8 is a high-level block diagram of robotic liquid handler 200. Robotic liquid handler 200 can comprise control computer 908 operatively coupled to structure 940, transport device 941, processing apparatus 901 and thermalcycler system 907. Input/output interfaces may be present in each of these devices to allow for data transmission between the illustrated devices and external devices. Robotic liquid handler 200 can comprise a fluid handling system as described herein. Fluids can include various liquids such as reagents and the like. An example of a processing system in which the present disclosure can be implemented is the Biomek i7 Automated Workstation marketed by the Beckman Coulter, Inc. of Brea, CA.

For explanatory purposes, robotic liquid handler 200 will mainly be described as a system for processing and analyzing biological samples, such as the preparation of libraries of nucleic acid fragments (e.g., libraries of fragments derived from DNA or RNA molecules) including, but not limited to, next-generation sequencing (NGS) libraries Structure 940 can include a housing (e.g., housing 1002 of FIG. 9), legs or casters to support the housing, a power source, deck 905 loadable within the housing, and any other suitable feature. Deck 905 can include a physical surface (e.g., platform 1012 of FIG. 9) such as a planar physical surface upon which components can be placed and accessed for experiments, analyses, and processes. In some instances, deck 905 can be a floor or a tabletop surface. Deck 905 can be subdivided into a plurality of discrete deck locations (e.g., locations L1-L16 of FIG. 11) for placing different components. The locations can be directly adjacent or can be spaced apart from each other. Each deck location can include dividers, inserts, and/or any other support structure for separating the different deck locations and containing components. For example, FIG. 8 shows first location 905A, second location 905B, and third location 905C on deck 905, though additional locations can be included. One or more of locations 905A-905C can be loaded with a carousel (e.g., carousel 1004 of FIG. 9) or one or more reagent reservoirs or liquid vessels (e.g. reaction vessel 103 of FIG. 9) that can include spaces for holding one or more components. Structure 940 can additionally include a motor or another device for rotating the carousel relative to deck 905 to facilitate, among other things, interaction with transport device 941, a reagent reservoir and thermalcycler system 907. Furthermore, motor of structure 940, or an additional motor of structure 940, can be used to rotate individual vials loaded onto deck 905, a tray or reagent reservoir loaded on deck 905 or a carousel located on deck 905.

Transport device 941, which can comprise a trolley, bridge or carriage system having moving capabilities in x and y directions and hoisting capabilities in a z direction, which can represent multiple transport devices, can prepare and/or transport components between deck 905 and processing apparatus 901, as well as between different locations on deck 905. Examples of transport devices may include conveyors, cranes, sample tracks, pick and place grippers, laboratory transport elements that can move independently (e.g., pucks, hubs or pedestals), robotic arms, and other tube or component conveying mechanisms. In some embodiments, transport device 941 includes a pipetting head configured to transfer liquids. Such a pipetting head may transfer liquids within removable pipette/pipettor tips and may include grippers suitable for grasping or releasing other labware, such as microwell plates or lids for reagent reservoir 100.

Processing apparatus 901 can include any number of machines or instruments for executing any suitable process. For example, processing apparatus 901 can include an analyzer, which may include any suitable instrument that is capable of analyzing a sample such as a biological sample. Examples of analyzers include spectrophotometers, luminometers, mass spectrometers, immunoanalyzers, hematology analyzers, microbiology analyzers, and/or molecular biology analyzers. In some embodiments, processing apparatus 901 can include a sample staging apparatus. A sample staging apparatus can include a sample presentment unit for receiving sample tubes with biological samples, a sample storage unit for temporarily storing sample tubes or sample retention vessels, a means or device for aliquotting a sample, such as an aliquottor, a means for holding at least one reagent pack comprising the reagents needed for an analyzer, and any other suitable features.

Thermalcycler system 907 can be positioned relative to deck 905 and can be configured to receive a liquid vessel. Reaction vessels (e.g., 103 in FIG. 10) can be loaded manually into thermalcycler system 907 or via transport device 941. Thermalcycler system 907 can be configured to provide a plurality of different heating zones, as will be discussed below in greater detail with reference to FIG. 10, that can heat different portions of liquid vessels to different temperatures. For example, thermalcycler system 907 can comprise three stacked or vertical levels of heating to provide top, middle and bottom heating zones to liquid vesses. Thus, for example, depending on the amount and type of liquid disposed in a liquid vessel, different amounts of heating can be applied, such as to perform thermalcycling and incubating processes.

Robotic liquid handler 200 can be provided with an imaging system, e.g., a camera, to read labels of reagent vials loaded onto deck 905. The imaging system can ensure that all portions of any single reagent vial label loaded into robotic liquid handler 200 is in view of at least one camera. Thus, for a reagent vial label that is wrapped around the circumference of a reagent vial, one or more imaging devices, with or without the use of mirrors or turntables, can have complete three-hundred-sixty-degree view of each reagent vial. The imaging device can be any suitable device for capturing an image of deck 905 and any components on deck 905 or the entirety of structure 940. The imaging device can comprise one of a plurality of imaging devices mounted to or nearby structure 940. In additional examples, multiple imaging devices can be mounted to obtain multiple views of reagent vials disposed on deck 905. For example, the imaging device can be any suitable type of camera, such as a photo camera, a video camera, a three-dimensional image camera, an infrared camera, etc. Some embodiments can also include three-dimensional laser scanners, infrared light depth-sensing technology, or other tools for creating a three-dimensional surface map of objects and/or a room. In examples, the imaging device can utilize slit-scan technology to produce panoramic images. Images taken by the imaging system can be analyzed for recognition of visual indicators, e.g., numbers, text or symbols, by the fluid handling system.

Control computer 908 can control the processes run on processing system 900, initially configure the processes, and check whether a component setup has been correctly prepared for a process. Control computer 908 can control and/or transmit messages to processing apparatus 901, transport device 941, and/or thermalcycler system 907. Control computer 908 can comprise data processor 908A, non-transitory computer readable medium 908B and data storage 908C coupled to data processor 908A, one or more input devices 908D and one or more output devices 908E. Although control computer 908 is depicted as a single entity in FIG. 8, it is understood that control computer 908 may be present in a distributed system or in a cloud-based environment. Additionally, embodiments allow some or all of control computer 908, processing apparatus 901, transport device 941, and/or thermalcycler system 907 to be combined as constituent parts in a single device.

Output device 908E can comprise any suitable devices that can output data. Examples of output device 908E can include display screens, video monitors, speakers, audio and visual alarms and data transmission devices. Input device 908D can include any suitable device capable of inputting data into control computer 908. Examples of input devices can include buttons, a keyboard, a mouse, touchscreens, touch pads, microphones, video cameras and sensors (e.g., light sensor, position sensors, speed sensor, proximity sensors).

Data processor 908A can include any suitable data computation device or combination of such devices. An example of a data processor may comprise one or more microprocessors working together to accomplish a desired function. Data processor 908A can include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; ARM-based/family processors and/or the like processor(s).

Computer readable medium 908B and data storage 908C can be any suitable device or devices that can store electronic data. Examples of memories may comprise one or more memory chips, disk drives, etc. Such memories may operate using any suitable electrical, optical, and/or magnetic mode of operation.

Computer readable medium 908B can comprise code, executable by data processor 908A to perform any suitable method. For example, computer readable medium 908B can comprise code, executable by processor 908A, to cause processing system 900 to perform automated reagent processing and heating methods including mixing of various reagents within labware to different levels, heating the labware to different levels, adding additional reagents and performing additional heating using thermalcycler system 907.

Computer readable medium 908B can comprise code, executable by data processor 908A, to receive and store process steps for one or more protocols (e.g., a protocol for processing a biological sample or a protocol for a library construction process), as well as to control thermalcycler system 907, structure 940, transport device 941, and/or processing apparatus 901 to execute the process steps for the one or more protocols, such as those described with reference to the Examples section below. Computer readable medium 908B can also include code, executable by data processor 908A, for receiving results from processing apparatus 901 (e.g., results from analyzing a biological sample) and for forwarding the results or using the results for additional analysis (e.g., diagnosing a patient). Additionally, computer readable medium 908B can comprise code, executable by data processor 908A, for obtaining an image of deck 905, identifying information in the images of deck 905, deciphering information in the images using information stored in data storage 908C or computer readable medium 908B by comparing the deciphered information to information contained in protocol 908F, and loading thermalcycler system 907 accordingly.

Data storage component 908C can be internal or external to control computer 908. Data storage component 908C can include one or more memories including one or more memory chips, disk drives, etc. Data storage component 908C can also include a conventional, fault tolerant, relational, scalable, secure database such as those commercially available from Oracle™ or Sybase™. Data storage 908C can store protocols 908F and images 908G. Data storage component 908C can additionally include instructions for data processor 908A, including protocols. Computer readable medium 908B and data storage component 908C can comprise any suitable storage device, such as non-volatile memory, magnetic memory, flash memory, volatile memory, programmable read-only memory and the like.

Protocols 908F in data storage component 908C can include information about one or more protocols. A protocol can include information about one or more processing steps to complete, components used during the process, a component location layout, loading of reagent reservoir 100 and/or any other suitable information for completing a process. For example, a protocol can include one or more ordered steps for processing a biological sample or processing a DNA library. A protocol can also include steps for preparing a list of components before starting the process. The components can be mapped to specific locations in the reagent reservoir (e.g., reagent reservoir 100), in the carousel (e.g., carousel 1004) or in a microplate mounted to ambient storage location containing index adapters or other reagents in microplates where transport device 941 can obtain the components in order to transport them or the container they are loaded into to processing apparatus 901 or thermalcycler system 907. This mapping can be encoded as instructions for operating transport device 941, such as instructions directing a pipettor to aspirate a volume of liquid from a labware in the carousel and to dispense the volume at a predetermined destination, and the mapping can also be represented by a virtual image shown to a user such that the user can place the components on deck 905, the reagent reservoir and the carousel. Robotic liquid handler 200 can be used for multiple processes (e.g., multiple different sample processes or preparation procedures). Accordingly, information about multiple protocols 908F can be stored and retrieved when needed. Components on deck 905, the reagent reservoirs and the carousel can be rearranged, changed, and/or replenished as necessary when changing from a first process to a second process, or when re-starting a first process.

Images 908G in data storage 908C can include a real-world or simulated visual representation of deck 905, the reagent reservoirs and the carousel, as well as of components disposed on or in deck 905, the reagent reservoirs and the carousel and labels disposed on those components. In each image, deck 905, the reagent reservoirs and the carousel can be shown in a ready state for beginning a certain process, with components for executing a protocol placed in locations accessible to transport device 941. Each of images 908G can be associated with a specific protocol from the stored protocols 908F. There can be a single image for certain protocol or there can be multiple images (e.g., from different angles, with different lighting levels, or containing acceptable labware substitutions in some locations) for a certain protocol. Images 908G can be stored as various types or formats of image files including JPEG, TIFF, GIF, BMP, PNG, and/or RAW image files, as well as AVI, WMV, MOV, MP4, and/or FL V video files.

Deck 905 can be subdivided into a plurality of discrete deck locations for staging different components. The discrete locations may be of any suitable size. An example of deck 905 with a plurality of locations is shown in FIG. 10. Deck 905 in FIG. 10 shows separate areas numbered L1 through L16, as well as thermal cycler 1008, which can operate as a separate location for separate types of components or packages of components. Deck 905 can have additional locations or fewer locations as desired. While these locations can be numbered or named, they may or may not be physically labeled or marked on deck 905 in physical embodiments of the system.

Images, such as images 908G, can be used to verify if the proper components are loaded into deck 905, the reagent vessels and lids, if needed, the carousel and thermalcycler system 907 for completing protocol 908F programmed into processing system 900 by an operator, and if those components are located in correct positions for executing the programmed protocol, if required by the protocol. As discussed herein, processing system 900 can thereafter execute mixing procedures for liquids loaded into reagent reservoirs, e.g., reagent reservoir 100, and controllably heat the reagent reservoir using thermalcycler system 1008 in a variety of different manners depending on the liquids loaded into the reagent reservoir, thereby eliminating the need for having different types and sizes of reagent reservoirs and different capacities and configurations of thermalcycler systems included in processing system 900.

FIG. 9 is perspective view of liquid handling system 1000 that can comprise an example of robotic liquid handler 200 of FIG. 8. Liquid handling system 1000 can comprise housing 1002, carousel 1004, reaction vessel 103, imaging device 1006 and thermalcycler system 1008. Note, components of FIG. 9 are not necessarily drawn to scale for illustrative purposes. Housing 1002 can comprise a plurality of walls or panels that form an enclosure into which carousel 1004 can be positioned. The enclosure can have an opening over which door or other access point for a user 1010 can be positioned to encapsulate carousel 1004, imaging device 1006 and thermalcycler system 1008 within the enclosure. Housing 1002 can additionally include platform 1012 on which a deck, such as deck 905 (FIG. 8) or deck 905 (FIG. 10) can be positioned. The deck can include a slot or socket for receiving carousel 1004 and one or more of reagent reservoirs 100. In examples, the slots or sockets can be configured to hold carousel 1004 and reagent reservoir 100 in a predetermined or know position relative to imaging device 1006. Platform 1012 can hold the deck in a predetermined or known position relative to imaging device 1006. Housing 1002 can additionally comprise space for holding controller 1014, such as those of control computer 908 (FIG. 8). Controller 1014 can be configured to communicate with network 1016, such as via a wireless or wired communication link.

Imaging device 1006, which may comprise imaging device described with reference to of FIG. 8, can be located within housing 1002 in a stationary location. One or more imaging devices 1006 can be configured to point at a single location or multiple locations in housing 1002. Simultaneously, a pipettor of transport device 941 or processing apparatus 901 (FIG. 8) can be located within housing 1002 to access a location of carousel 1004. Transport device 941 can additionally be configured to move reagent reservoir 100 into thermalcycler system 1008. Carousel 1004 can spin or rotate to present different locations to the pipettor and imaging device 1006. In other examples, imaging device 1006 can be mounted within housing 1002 to move a viewing area over different portions of the interior of housing 1002.

Controller 1014 can be configured to execute a protocol for components loaded into carousel 1004 and reagent reservoir 100 and loaded onto the deck within housing 1002. In order for controller 1014 to perform one or more sequences of steps on a set of vials loaded into carousel 1004 and reagent reservoir 100 per the protocol, controller 1014 should know the location of each vial within carousel 1004 and reagent reservoir 100, e.g., the contents of each vial at each location within carousel 1004 and reagent reservoir 100. As discussed herein, controller 1014 can be configured to operate imaging device 1006 to obtain images of carousel 1004 and reagent reservoir 100 and components loaded therein. In particular, carousel 1004 can be loaded with vials of material, wherein each vial can have a label that provides identifying information as to the contents of each vial, a set of vials to which each vial belongs, a manufacturer of the set of vials, one or more protocols for liquid handling system 1000 to execute with the set of vials, etc. Images of the vial labels can be read by controller 1014 to recognize information presented in the labels. The information read from the labels can be compared to information, such as information obtained from network 1016, stored in a computer readable medium, such as medium 908B of FIG. 8. The information stored in the computer readable medium can include a protocol for the set of vials that includes one or more sequences of steps for interacting with the set of vials, such as an order for which transport device 941 can interact with each vial, such as for moving reagents into carousel 1004 and reagent reservoir 100 and therebetween.

Reaction vessels 103 can be moved into thermalcycler system 1008, either manually or automatically by transport device 941. Controller 1014 can operate thermalcycler system 1008 to execute or partially execute various protocols and protocol steps. Controller 1014 can operate thermalcycler system 1008 and transport device 941 to heat liquid vessels loaded into thermalcycler system 1008. Thermalcycler system 1008 can comprise a plurality of heating zones and reaction vessel can have a geometry forming a plurality of different shaped storage volumes, that each can have a different wall thickness for interacting with the heating zones. As such, a single thermalcycler system 1008 and a single reaction vessel can be used to perform a large quantity of procedures using the different combinations of heating zones and storage volumes without the need for additional equipment or reaction vessels, such as those described in the Examples section below.

FIG. 10 is plan view of deck 905 for loading onto platform 1012 of housing 1002 of FIG. 10. Deck 905 can include spaces or locations for various components, including carousel 1004. Imaging device 1006 can be mounted within housing 1002 relative to platform 1012 such that imaging device can produce a field of view that covers all of platform 1012. However, in various examples, the field of view can be configured to cover only portions of platform 1012 and multiple imaging device can be used or an articulating imaging device can be used that can move the field of view across platform 1012 to different locations to achieve total coverage. Likewise, a transport system, such as transport device 941 of FIG. 8, can be configured to reach the entirety of platform 1012.

FIG. 10 shows deck 905 including locations numbered L1-L16, as well as other components such as thermalcycler system 908, which can operate as a separate location for separate types of components or packages of components. Examples of deck 905 can have additional locations or fewer locations, as desired. While these locations can be numbered or named, the locations may or may not be physically labeled or marked on deck 905 in physical embodiments of liquid handling system 1000. In examples of liquid handling system 1000, some or all of the locations can be occupied by a pre-defined type of component according to a certain protocol. For example, locations L1-L10 can comprise storage locations for pipette tip racks 1018 and 1120 (e.g., pipette tips of various volumes), and location L11 can be loaded with carousel 1004. Location L12 can comprise a cold reagent storage area for reaction vessels, lids, and plugs. Location L13 can comprise a warm reagent storage area for reaction vessels. Location L15 can comprise a storage area for reagent reservoirs 100. Location L14 can comprise an reaction vessel stack storage area. Location L16 can comprise a waste storage area for bin 1124. Some of locations L1-L16 can include the same type of component. The components can comprise test tubes, microwell or microtiter plates, pipette tips, plate-lids, reagent reservoirs 100 or any other suitable labware component. The components can also comprise an item of laboratory equipment, such as a shaker, stirrer, mixer, temperature-incubator, vacuum manifold, magnetic plate, thermalcycler, centrifuge or the like. In examples, one or more locations can be physically part of structure 940 (FIG. 8), housing 1002 (FIG. 9) or deck 905 (FIG. 10), or can be a separate component disposed on platform 1012. Each of locations L1-L16 can be accessed by transport device 941 (FIG. 8). For example, locations L1-L16, and thermal cycler 1124 can be physically separate from structure 940 or deck 905.

Imaging device 1006 can be configured to recognize the presence of one or more components at each of locations L1-L16, the presence of carousel 1004 at location L11, and the presence of reagent reservoirs 100 at location L15, for example. Furthermore, imaging device 1006 can be configured to read information from the one or more components located at each of locations L1-L16. Components, e.g., vials of liquid, can be loaded into carousel 1004 in a desired manner, e.g., according to a protocol and liquid therefrom, or from another location, can be loaded into one of reaction vessels 103 for loading into thermalcycler system 1008 according to the protocol. Images of carousel 1004 taken by imaging device 1006 can be used to read information from labels of vials loaded into carousel 1004. Thereafter, thermalcycler system 1008 can execute a heating method, such as those discussed with reference to the Examples section below, to heat the liquid loaded into the thermalcycler system 1008 according to the protocol.

Other methods contemplated herein include a method of transferring liquid using a robotic liquid handler, the method comprising:

filling a reagent reservoir with a liquid such that a sloped bottom of the reagent reservoir, wherein the sloped bottom forms a deep end and a shallow end; removing a first portion of the liquid from the reagent reservoir using a multi-channel pipettor having a first pipettor tip extending into a first position near the shallow end and a second pipettor tip extending into a second position near the deep end; and removing a second portion of the liquid from the reagent reservoir using a multi-channel pipettor having a single pipettor tip extending into a second position near the deep end or a pipettor tip of a single-channel pipettor or a single channel of a multi-channel pipettor extending into the deep end. Removing the first portion of the liquid from the reagent reservoir using the multi-channel pipettor can result in the liquid emptying from the shallow end of the reagent reservoir. The removing the first portion of the liquid from the reagent reservoir can further comprise repeating aspiration of liquid from the second volume with the second pipettor. The removing a second portion of the liquid from the reagent reservoir using a multi-channel pipettor having a single pipettor tip extending into a second position near the deep end or a pipettor tip of a single-channel pipettor extending into the deep end can result in removing all of the liquid in the first volume.

Still other methods contemplated herein include a method of transferring liquid using a robotic liquid handler, the method comprising:

aspirating a first volume of liquid out of a reagent reservoir using a first pipettor of the robotic liquid handler, the first pipettor having a number of tips including a first tip and a second tip, the reagent reservoir having a sloped bottom along a length of the reservoir, the sloped bottom defining a shallow end and a deep end of the reagent reservoir, wherein the first tip is positioned over the shallow end of the reagent reservoir and another tip is positioned over the deep end of the reagent reservoir during the aspiration of the first volume of liquid; and aspirating a second volume of liquid out of the reagent reservoir using a second pipettor of the robotic liquid handler, the second pipettor having a number of tips less than the number of tips of the first pipettor, wherein a tip of the second pipettor is positioned over the deep end of the reagent reservoir during the aspiration of the second volume. The method can further comprise suspending a particles in the liquid such that particles do not preferentially or substantially settle in the deep end.

Additional methods contemplated herein include a method of transferring liquid from a bulk storage reservoir using a robotic liquid handler, the method comprising:

adding liquid to the bulk storage reservoir such that:

a first volume of the bulk storage reservoir formed by a sloped bottom of the storage reservoir forming a deep end and a shallow end fills; and a second volume of the bulk storage vessel above the first volume formed by first and second end-walls of the bulk storage vessel at the deep and shallow above becomes at least partially filled;

emptying the second volume using a multi-channel pipettor; and emptying the first volume using a single-channel pipettor or a single channel of a multi-channel pipettor. The multi-channel pipettor can extend between the first end-wall and the second end-wall above the first volume; and the single-channel pipettor extends across the deep end.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading can occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Those skilled in the art will appreciate that many modifications to the embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of or illustrative embodiments is provided for the purpose of illustrating the principles of the present disclosure and not in limitation thereof and can include modification thereto and permutations thereof.

EXAMPLES

The present invention can be better understood by reference to the following examples which are offered by way of illustration. The present invention is not limited to the examples given herein.

The bulk reagent reservoirs described herein decrease the dead volume/waste while allowing the systems described herein to process samples in a way that increases speed and throughput. The bulk reagent reservoirs can have a dead volume of 50 μL if accessed by 1 tip, and approximately 500 μL when using 8 tips. A 3% grade from horizontal at the bottom portion of the reservoir can allow the decreasing volume in the reservoir over the application run to pool at the lowest point at the back of the reservoir. At the beginning of a method, reservoirs can be filled with the estimated volume of a reagent needed to complete the application. As reagent is aliquoted from the bulk reservoir and volume decreases, the application can track the remaining amount of liquid in the reservoir. When the automation reaches a point where the next pipetting action will take the calculated remaining volume below 500 μL, the systems described herein can switch from using 8 tips, to using 1 tip. This reduces the dead volume required by the application to use the reservoir and allows the automation to process samples efficiently.

Example 1

If the user wishes to run 24 samples and plans to use 60 μL sample of AmpureXP beads, the required volume for the run would be 1440 μL total assuming no dead volume. Dead volume is estimated at 50 μL in the bulk reservoir when we program the pipettor to run as follows:

Trip 1-60 μL for each of 8 tips, total volume removed will be 480 μL. Remaining volume will be 610 μL (1490 μL total volume).

Trip 2-60 μL for each of 8 tips, total volume moved will be 480 μL. Remaining volume will be 690 μL.

Trip 3-60 μL is desired for each of 8 tips for final transfer. However, that total aspiration would decrease the tracked volume in the bulk reagent reservoir to a calculated volume below the 500 μL threshold. Therefore, beginning at trip 3, the systemd described herein can be programmed to automatically switch to pipetting 1 tip at a time for the remaining 8 tips (Trips 3-10).

By utilizing the reagent reservoirs described herein, the dead volume needed for a bulk reagent can be reduced by approximately 450 μL. This is especially important with reagents that come in application kits that are not packaged for automated systems. Low volume overages are a problem when automating applications. The reagent reservoirs described herein will enable the system to reduce the cost of a run. Using standard costs, the reagent described above would cost the user $2.40/mL. The reagent reservoirs described wherein will reduce cost from $4.66 to $3.46 per 24 sample run.

Example 2

To wash the beads aliquoted from above, the user will utilize 50 μL of 80% Ethanol. The total volume needed would be 50*24. The total volume for the run would be 1200 total assuming no dead volume. Dead volume is estimated at 50 μL in the bulk reservoir. When programmed as follows:

Trip 1-50 μL for each of 8 tips, total volume removed will be 400 μL. Remaining volume will be 850 μL (1250 μL total volume).

Trip 2-50 μL is desired for each of 8 tips for final transfer. However, that total aspiration would decrease the tracked volume in the bulk reagent reservoir to a calculated volume below the 500 μL threshold. Therefore, beginning at trip 2, the systemd described herein can be programmed to automatically switch to pipetting 1 tip at a time for the remaining 8 tips (Trips 2-17)

The system could be programmed for a larger dead input in this case if the choice was to optimize for speed. This would depend on the desire for a speed over dead volume as well as the cost of the reagent being pipetted. The bulk reagent reservoir design allows for the reduction in the volume needed. In the case above, it is not the cost that is a concern. However, ethanol is flammable. Using the bulk reagent reservoir will decrease the volume of harmful chemicals that are deployed on our pipetting systems. This will also reduce the amount of hazardous waste created by an automation platform.

Example 3

This example uses Illumine TruSight Oncology 500 (Document number 1000000067621 v02) Utilizing the 24 DNA ONLY workflow:

SPB (Sample Prep Beads) will be used in a bulk reagent reservoir, one time per 2 day in the 2 day protocol for library creation and enrichment.

Day 1 Library Generation: The standard protocol calls for the addition of 112 μL beads to each well to clean up the ligation reaction. The systems described herein can use millitips to pipette mix the bead solution by aspiration and dispensation of the bead mixture until the beads are fully suspended in the solution. The speed of the aspiration and dispensation will push beads off the bottom of the bulk reservoir. When tested in the lab, the beads do not "slide" down the slope of the reservoir if we maintain the 3% grade. The Ampure XL beads do not fall out of solution very quickly. Only 1 mix per transfer group will be needed.

Total volume needed for the bulk reservoir: 112 ul/sample plus 50 ul dead volume; total volume in reservoir is: 2738 μL

- Mix Ampure XL beads using 8 tips, 260 ul/tip 8 times to resuspend.
- Trip 1 transfer—112 ul to first 8 samples using 8 tips (remaining volume in reservoir will be 892 ul)
- Trip 2 transfer 112 ul to samples 9-16 using 8 tips (remaining volume will be 945 ul)
- Trips 3-10, 112 ul to each of the remaining 8 samples using 1 tip at a time since the tracked volume in the reservoir would dip below the 500 ul volume required to use 8 tips at a time.

Day 2 (Illumina manual page 29): The standard protocol calls for the addition of 110 ul beads to each well to clean up the amplified enriched library. The NGeniuS system will use millitips to pipette mix the bead solution by aspiration and dispensation of the bead mixture until the beads are fully suspended in the solution. The Ampure XL beads do not fall out of solution very quickly. Only 1 mix per transfer group will be needed.

Total volume needed for the bulk reservoir: 110 ul/sample plus dead volume Total volume in reservoir is: 2690 ul

- Mix Ampure XL beads using 8 tips, 260 μL/tip 8 times to resuspend.
- Trip 1 transfer—110 μL to first 8 samples using 8 tips (remaining volume in reservoir will be 1810 μL)
- Trip 2 transfer 110 μL to samples 9-16 using 8 tips (remaining volume will be 930 μL)
- Trips 3-10, 110 μL to each of the remaining 8 samples using 1 tip at a time since the tracked volume in the reservoir would dip below the 500 μL volume required to use 8 tips at a time.

The described procedure described in this Example can also be used for nonmagnetic reagents in the Illumina kit (RSB-Resuspension Buffer, 80% EtOH-Ethanol, EEW-Enhanced Enrichment Wash, LNA1-Library Normalization Additives (contains formamide) and other magnetic bead solutions (LNB1-Library Normalization Beads and SMB-Streptavidin Magnetic Beads).

LNA1 reagent listed above does emit gas and is dangerous if inhaled. It is wise to keep volumes as low as possible for use on the system.

Example 4

An experiment was conducted to determine whether beads (e.g., AMPureXP and Stretavidin beads) accumulate at the deeper end of the reagent reservoir when they are added to the reagent reservoir and allowed to settle. To that end, two separate reagent reservoirs were prepared: 1 mL of AMPureXP was added to one section and 2 mL of AMPureXP was added to a the second section. Photos were taken of the sides of the trough before settling. The reagent reservoir was covered with an adhesive seal and left to settle overnight. The next morning, the seal was removed. Photos (not included herein) showed that there does not appear to be any noticeable settling towards the deep end of the reagent reservoir when allowed to settle overnight.

Example 5

This experiment was meant to investigate how difficult is it to resuspend beads (e.g., AMPureXP and Stretavidin beads) in the reagent reservoir. To that end, 10 mL of AmpureXP were added to one side of a reagent reservoir and the beads were allowed to settle overnight. The next morning a multi-channel pipettor, specifically a i5 Span-8 available from Beckman Coulter, Brea, CA, was used to resuspend the beads that had settled. After three to four mixes the beads appeared to be completely resuspended.

Example 6

The AmpureXP suspension from Example 5 was completely removed from the reagent reservoir and 400 μL were returned to the reservoir. Utilizing a modified pipetting template, eight 15 μL of AmpureXP from the 400 μL suspension were added to eight wells of a PCR plate, removing 120 μL of the 400 μL from the reagent reservoir. Pipetting was successful for all eight samples.

Example 7

This experiment was conducted to explore the effects of the angle θ (see FIG. 1) on the ability to use multiple tips (e.g., from a i5 Span-8 pipettor) to resuspend beads. To that end, 2 mL of AMPureXP was added to a series of six reagent reservoirs and the reservoirs were sealed to prevent evaporation. The beads were allowed to settle overnight. Three of the reservoirs had an angle θ of 3° and three had an angle θ of 8°. As expected, the triangle defined by the beads becomes as shown in FIG. 11 as the slope increases. As a result, the area of bead settling becomes smaller as θ increases. The reduced area does not permit more than 1 tip being used for bead resuspension. In some instances, therefore, 3-4° of slope may be better than 7-8° of slope.

Select embodiments of the present disclosure include, but are not limited to, the following:

Embodiment 1 relates to a method of transferring liquid using a robotic liquid handler, the method comprising: aspirating a first volume of liquid out of a reagent reservoir using a multi-channel pipettor of the robotic liquid handler, the reagent reservoir having a sloped bottom along a length of the reagent reservoir, the sloped bottom defining a shallow end and a deep end of the reagent reservoir, wherein the shallow end is proximal to a first side-wall of the reagent reservoir, wherein the deep end is proximal to a second side-wall of the reagent reservoir opposite the first side-wall; and aspirating a second volume of liquid out of the deep end of the reagent reservoir using a single-channel pipettor or a single channel of a multi-channel pipettor of the robotic liquid handler, wherein aspiration of the second volume out of the deep end results in depletion of liquid in the shallow end of the reagent reservoir Embodiment 2 relates to the method of Embodiment 1, wherein the single-channel pipettor or single channel of a multi-channel pipettor is positioned at a deepest portion of reagent reservoir, wherein the deepest portion is proximal to the second side-wall of the reagent reservoir.

Embodiment 3 relates to the method of Embodiments 1-2, wherein the reagent reservoir has a decreasing cross-section along a width of the reagent reservoir from the first side-wall to the second side-wall.

Embodiment 4 relates to the method of Embodiment 3, wherein aspirating the first volume of liquid out of the reagent reservoir using the multi-channel pipettor of the robotic liquid handler comprises aspirating the first volume using the multi-channel pipettor along the width of the reagent reservoir from the first side-wall to the second side-wall.

Embodiment 5 relates to the method of Embodiments 1-4, wherein the reagent reservoir has multiple chambers, each with sloped bottom.

Embodiment 6 relates to the method of Embodiment 5, wherein multiple chambers are formed by a dividing wall running along length of the reservoir.

Embodiment 7 relates to the method of Embodiments 1-6, further comprising: depositing particled in the liquid; and allowing the particles to become suspended in the liquid; wherein the particles settle evenly along the sloped bottom.

Embodiment 8 relates to the method of Embodiments 1-7, further comprising:

aligning tabs with slots on the liquid handler to position the reagent reservoir on a deck of the robotic liquid handler.

Embodiment 9 relates to the method of Embodiments 1-8, further comprising:

engaging tabs of the reagent reservoir with a deck of the robotic liquid handler to elevate the shallow end above the deep end and the first side-wall and the second side-wall stand vertical on the deck.

Embodiment 10 relates to a method of transferring liquid using a robotic liquid handler, the method comprising:

filling a reagent reservoir with a liquid such that a sloped bottom of the reagent reservoir, wherein the sloped bottom forms a deep end and a shallow end;

removing a first portion of the liquid from the reagent reservoir using a multi-channel pipettor having a first pipettor tip extending into a first position near the shallow end and a second pipettor tip extending into a second position near the deep end; and removing a second portion of the liquid from the reagent reservoir using a multi-channel pipettor having a single pipettor tip extending into a second position near the deep end or a pipettor tip of a single-channel pipettor extending into the deep end.

Embodiment 11 relates to the method of Embodiment 10, wherein removing the first portion of the liquid from the reagent reservoir using the multi-channel pipettor can result in the liquid emptying from the shallow end of the reagent reservoir.

Embodiment 12 relates to the method of Embodiment 10, wherein removing the first portion of the liquid from the reagent reservoir can further comprise repeating aspiration of liquid from the second volume with the second pipettor.

Embodiment 13 relates to the method of Embodiment 10, wherein removing a second portion of the liquid from the reagent reservoir using the multi-channel pipettor having a single pipettor tip extending into a second position near the deep end or a pipettor tip of a single-channel pipettor extending into the deep end can result in removing all of the liquid in the first volume.

Embodiment 14 relates to a method of transferring liquid using a robotic liquid handler, the method comprising:

aspirating a first volume of liquid out of a reagent reservoir using a first pipettor of the robotic liquid handler, the first pipettor having a number of tips including a first tip and a second tip, the reagent reservoir having a sloped bottom along a length of the reservoir, the sloped bottom defining a shallow end and a deep end of the reagent reservoir, wherein the first tip is positioned over the shallow end of the reagent reservoir and another tip is positioned over the deep end of the reagent reservoir during the aspiration of the first volume of liquid; and aspirating a second volume of liquid out of the reagent reservoir using a second pipettor of the robotic liquid handler, the second pipettor having a number of tips less than the number of tips of the first pipettor, wherein a tip of the second pipettor is positioned over the deep end of the reagent reservoir during the aspiration of the second volume.

Embodiment 15 relates to the method of Embodiment 14, further comprising suspending a particles in the liquid such that particles do not preferentially settle in the deep end.

Embodiment 16 relates to a method of transferring liquid from a bulk storage vessel using a robotic liquid handler, the method comprising:

adding liquid to the bulk storage reservoir such that: a first volume of the bulk storage reservoir formed by a sloped bottom of the storage reservoir forming a deep end and a shallow end fills; and a second volume of the bulk storage vessel above the first volume formed by first and second end-walls of the bulk storage vessel at the deep and shallow above becomes at least partially filled;

emptying the second volume using a multi-channel pipettor; and emptying the first volume using a single-channel pipettor or a single channel of a multi-channel pipettor.

Embodiment 17 relates to the method of Embodiment 16, wherein:

the multi-channel pipettor extends between the first end-wall and the second end-wall above the first volume; and the single-channel pipettor or a single channel of a multi-channel pipettor extends across the deep end.

What is claimed is:

1. A method of transferring a liquid using a robotic liquid handler, the method comprising:

positioning a multi-channel pipettor controlled by a transport device at a deck location of the robotic liquid handler;

aspirating a first volume of liquid out of a reagent reservoir using the multi-channel pipettor of the robotic liquid handler, the reagent reservoir having a sloped bottom along a width of the reagent reservoir, the sloped bottom defining a shallow end and a deep end of the reagent reservoir, and a floor with decreasing cross-section along the width of the reagent reservoir from a first side-wall to a second side-wall, wherein the shallow end is proximal to the first side-wall of the reagent reservoir, wherein the deep end is proximal to the second side-wall of the reagent reservoir opposite the first side-wall, and wherein aspirating the first volume of liquid out of the reagent reservoir using the multi-channel pipettor of the robotic liquid handler comprises aspirating the first volume using the multi-channel pipettor along the width of the reagent reservoir from the first side-wall to the second side-wall;

positioning a single channel of a multi-channel pipettor controlled by the transport device over the deep end of the reagent reservoir; and aspirating a second volume of liquid out of the deep end of the reagent reservoir using the single channel of a multi-channel pipettor of the robotic liquid handler, wherein aspiration of the second volume out of the deep end results in depletion of liquid in the shallow end of the reagent reservoir.

2. The method of claim 1, wherein the single channel of a multi-channel pipettor is positioned at a deepest portion of reagent reservoir, wherein the deepest portion is proximal to the second side-wall of the reagent reservoir.

3. The method of claim 1, wherein the reagent reservoir has a decreasing cross-section along the width of the reagent reservoir from the first side-wall to the second side-wall.

4. The method of claim 3, wherein aspirating the first volume of liquid out of the reagent reservoir using the multi-channel pipettor of the robotic liquid handler comprises aspirating the first volume using the multi-channel pipettor along the width of the reagent reservoir from the first side-wall to the second side-wall.

5. The method of claim 1, wherein the reagent reservoir has multiple chambers, each with sloped bottom.

6. The method of claim 5, wherein multiple chambers are formed by a dividing wall spanning the width of the reservoir.

7. The method of claim 1, further comprising:

depositing particles in the liquid; and allowing the particles to become suspended in the liquid;

wherein the particles settle evenly along the sloped bottom.

8. The method of claim 1, further comprising:

aligning tabs with slots on the liquid handler to position the reagent reservoir on a deck of the robotic liquid handler.

9. The method of claim 1, further comprising:

engaging tabs of the reagent reservoir with a deck of the robotic liquid handler to elevate the shallow end above the deep end and the first side-wall and the second side-wall stand vertical on the deck.

10. A method of transferring liquid using a robotic liquid handler, the method comprising:

filling a reagent reservoir with a liquid such that a sloped bottom of the reagent reservoir, wherein the sloped bottom forms a deep end and a shallow end, the reagent reservoir having a floor with decreasing cross-section along a width of the reagent reservoir from a first side-wall to a second side-wall;

positioning a multi-channel pipettor controlled by a transport device at a deck location of the robotic liquid handler;

removing a first portion of the liquid from the reagent reservoir using the multi-channel pipettor having a first pipettor tip extending into a first position near the shallow end and a second pipettor tip extending into a second position near the deep end, and wherein removing the first portion of the liquid from the reagent reservoir using the multi-channel pipettor comprises removing the first portion using the multi-channel pipettor along the width of the reagent reservoir from the deep end to the shallow end;

positioning a single pipettor tip of a multi-channel pipettor controlled by the transport device over the deep end of the reagent reservoir; and removing a second portion of the liquid from the reagent reservoir using the multi-channel pipettor having the single pipettor tip extending into a second position near the deep end.

11. The method of claim 10, wherein removing the first portion of the liquid from the reagent reservoir using the multi-channel pipettor can result in the liquid emptying from the shallow end of the reagent reservoir.

12. The method of claim 10, wherein removing the first portion of the liquid from the reagent reservoir can further comprise repeating aspiration of liquid from the second portion with the second pipettor tip.

13. The method of claim 10, wherein removing a second portion of the liquid from the reagent reservoir using the multi-channel pipettor having a single pipettor tip extending into a second position near the deep end or a pipettor tip of a single-channel pipettor extending into the deep end can result in removing all of the liquid in the first portion.

14. A method of transferring liquid using a robotic liquid handler, the method comprising:

positioning a first pipettor controlled by a transport device at a deck location of the robotic liquid handler;

aspirating a first volume of liquid out of a reagent reservoir using the first pipettor of the robotic liquid handler, the first pipettor having a number of tips including a first tip and a second tip, the reagent reservoir having a sloped bottom along a width of the reservoir, the sloped bottom defining a shallow end and a deep end of the reagent reservoir, and a floor with decreasing cross-section along the width of the reagent reservoir from a first side-wall to a second side-wall, wherein the first tip is positioned over the shallow end of the reagent reservoir and another tip is positioned over the deep end of the reagent reservoir during the aspiration of the first volume of liquid, and wherein aspirating the first volume of liquid out of the reagent reservoir using the first pipettor comprising aspirating the first volume using the first pipettor along the width of the reagent reservoir from the shallow end to the deep end;

positioning a second pipettor controlled by the transport device over the deep end of the reagent reservoir; and aspirating a second volume of liquid out of the reagent reservoir using the second pipettor of the robotic liquid handler, the second pipettor having a number of tips less than the number of tips of the first pipettor, wherein a tip of the second pipettor is positioned over the deep end of the reagent reservoir during the aspiration of the second volume.

15. A method of transferring liquid from a bulk storage reservoir using a robotic liquid handler, the method comprising:

adding liquid to the bulk storage reservoir such that:

a first volume of the bulk storage reservoir formed by a sloped bottom of the storage reservoir forming a deep end and a shallow end fills, the reagent reservoir having a floor with decreasing cross-section along a width of the reagent reservoir from a first side-wall to a second side-wall; and a second volume of the bulk storage reservoir above the first volume formed by first and second end-walls of the bulk storage reservoir at the deep and shallow ends becomes at least partially filled;

positioning a multi-channel pipettor controlled by a transport device at a deck location of the robotic liquid handler;

emptying the second volume using the multi-channel pipettor along the width of the bulk storage reservoir;

positioning a single channel of a multi-channel pipettor controlled by the transport device over the deep end of the reagent reservoir; and emptying the first volume using the single channel of a multi-channel pipettor.

16. A method of transferring a liquid using a robotic liquid handler, the method comprising:

positioning a multi-channel pipettor controlled by a transport device at a deck location of the robotic liquid handler;

aspirating a first volume of liquid out of a reagent reservoir using the multi-channel pipettor of the robotic liquid handler, the reagent reservoir having a sloped bottom along a width of the reagent reservoir, the sloped bottom defining a shallow end and a deep end of the reagent reservoir, and a floor with decreasing cross-section along the width of the reagent reservoir from a first side-wall to a second side-wall, wherein the shallow end is proximal to the first side-wall of the reagent reservoir, wherein the deep end is proximal to the second side-wall of the reagent reservoir opposite the first side-wall, and wherein aspirating the first volume of liquid out of the reagent reservoir using the multi-channel pipettor of the robotic liquid handler comprises aspirating the first volume using the multi-channel pipettor along the width of the reagent reservoir from the first side-wall to the second side-wall;

positioning a single channel pipettor controlled by the transport device over the deep end of the reagent reservoir; and aspirating a second volume of liquid out of the deep end of the reagent reservoir using the single channel pipettor of the robotic liquid handler, wherein aspiration of the second volume out of the deep end results in depletion of liquid in the shallow end of the reagent reservoir.

* * * * *